(12) United States Patent
Hudson et al.

(10) Patent No.: US 11,756,010 B2
(45) Date of Patent: Sep. 12, 2023

(54) SYSTEMS AND METHODS FOR TOKENIZING CORPORATE ACTIONS

(71) Applicant: JPMorgan Chase Bank, N.A., New York, NY (US)

(72) Inventors: David P. Hudson, Bournemouth (GB); Alex Dockx, London (GB); Nadia Rosse, London (GB); Michael McPolin, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 850 days.

(21) Appl. No.: 15/820,758

(22) Filed: Nov. 22, 2017

(65) Prior Publication Data
US 2019/0156304 A1 May 23, 2019

(51) Int. Cl.
*G06Q 20/06* (2012.01)
*H04L 9/32* (2006.01)
*G06Q 40/04* (2012.01)
*H04L 9/06* (2006.01)
*G06Q 40/06* (2012.01)

(52) U.S. Cl.
CPC ......... *G06Q 20/0652* (2013.01); *G06Q 40/04* (2013.01); *G06Q 40/06* (2013.01); *H04L 9/0637* (2013.01); *H04L 9/3213* (2013.01)

(58) Field of Classification Search
CPC ........ G06Q 40/04; G06Q 20/20; G06Q 40/06; G06Q 20/0652; H04L 9/0637; H04L 9/3213
USPC .......................................................... 705/69
See application file for complete search history.

(56) References Cited

U.S. PATENT DOCUMENTS

| 10,839,470 | B2* | 11/2020 | Grom et al. |
| 2009/0119095 | A1* | 5/2009 | Beggelman et al. |
| 2017/0011460 | A1* | 1/2017 | Molinari et al. |
| 2017/0330174 | A1* | 11/2017 | DeMarinis et al. |
| 2018/0097905 | A1* | 4/2018 | Todasco et al. |
| 2018/0331832 | A1* | 11/2018 | Pulsifer |
| 2019/0139032 | A1* | 5/2019 | Heavey |

(Continued)

OTHER PUBLICATIONS

Communication including European Search Report, European Patent Office, European Patent Application No. 18207919.4, dated Mar. 7, 2019, pp. 1-10.

(Continued)

*Primary Examiner* — Neha Patel
*Assistant Examiner* — Yin Y Choi
(74) *Attorney, Agent, or Firm* — GREENBERG TRAURIG LLP

(57) ABSTRACT

Systems and methods for tokenizing corporate actions are disclosed. In one embodiment, in an information processing apparatus for an issuer comprising at least one computer processor, a method for tokenizing corporate actions, may include (1) generating a plurality tokens for each participating share in an offering, each token associated with an exclusive option for an investor to take in response to the offering; (2) distributing the plurality of tokens to an electronic wallet associated with each investor; (3) receiving one of the plurality of plurality of tokens from an investor; (4) expiring the plurality of tokens that were not received from the investor; and (5) executing the option associated with the received token.

10 Claims, 2 Drawing Sheets

(56) References Cited

U.S. PATENT DOCUMENTS

2020/0058073 A1* 2/2020 Diedrich et al.

OTHER PUBLICATIONS

Anonymous, "Distributed Ledger Technology & Cybersecurity—Improving Information Security in the Financial Sector", www.enlsa.eruopa.eu, Dec. 2016, pp. 1-36.

* cited by examiner

SYSTEMS AND METHODS FOR TOKENIZING CORPORATE ACTIONS

BACKGROUND OF THE INVENTION

1. Field of the Invention

The present invention generally relates to systems and methods for tokenizing corporate actions.

2. Description of the Related Art

Distributed ledgers, such as Blockchain, provide a unique system for recording transactions and storing data. In general, distributed ledgers hold a log of transactions (events) that may be replicated across a public or private distributed network. Cryptography and digital signatures may be used to determine valid parties and transactions such that all parties/observers agree on the order and state of the ledger in real time without having to rely on a trusted third party to hold the true "golden copy." The distributed ledger thus provides a practically immutable, verifiably true audit trail.

SUMMARY OF THE INVENTION

Systems and methods for tokenizing corporate actions are disclosed. In one embodiment, in an information processing apparatus for an issuer comprising at least one computer processor, a method for tokenizing corporate actions, may include (1) generating a plurality tokens for each participating share in an offering, each token associated with an exclusive option for an investor to take in response to the offering; (2) distributing the plurality of tokens to an electronic wallet associated with each investor; (3) receiving one of the plurality of plurality of tokens from an investor; (4) expiring the plurality of tokens that were not received from the investor; and (5) executing the option associated with the received token.

In one embodiment, the token may include an expiration.

In one embodiment, the token may be received at an electronic wallet for the issuer.

In one embodiment, the method may further include committing the option associated with the received token to a distributed ledger.

In one embodiment, the offering may have a default option.

In one embodiment, the tokens may be provided to a third party by an investor, further comprising committing an updated ownership to a distributed ledger.

In one embodiment, the token may be received from a third party.

According to another embodiment, in an information processing apparatus for an issuer comprising at least one computer processor, a method for tokenizing corporate actions may include (1) generating a token for each participating share in an offering; (2) distributing the token to an electronic wallet associated with each investor; (3) providing a plurality of issuer wallets, wherein each issuer wallet is associated with an investor option; (4) receiving, at one of the plurality of wallets, the token; and (5) executing the option associated with the received token.

In one embodiment, the token may include an expiration.

In one embodiment, the method may further include committing the option associated with the wallet at which the token was received to a distributed ledger.

In one embodiment, the offering may have a default option.

In one embodiment, the tokens may be provided to a third party by an investor, and the method may further include committing an updated ownership to a distributed ledger.

In one embodiment, the token may be received from a third party.

According to another embodiment, a system for tokenizing corporate actions may include an issuer comprising an issuer backend, the issuer backend maintaining an issuer wallet; and a plurality of investors, each investor associated with an investor electronic device. The issuer backend may generate a plurality tokens for each participating share in an offering, each token associated with an exclusive option for the investors to take in response to the offering; may distribute the plurality of tokens to an electronic wallet associated with each of the plurality of investors; may receive one of the plurality of plurality of tokens from one of the investors at the issuer wallet; may expire the plurality of tokens that were not received from the investor; and may execute the option associated with the received token.

In one embodiment, the token may have an expiration.

In one embodiment, the token may be received at an electronic wallet for the issuer.

In one embodiment, the issuer backend may commit the option associated with the received token to a distributed ledger.

In one embodiment, the offering may have a default option.

In one embodiment, the tokens may be provided to a third party by an investor, further comprising committing an updated ownership to a distributed ledger.

In one embodiment, the token may be received from a third party.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
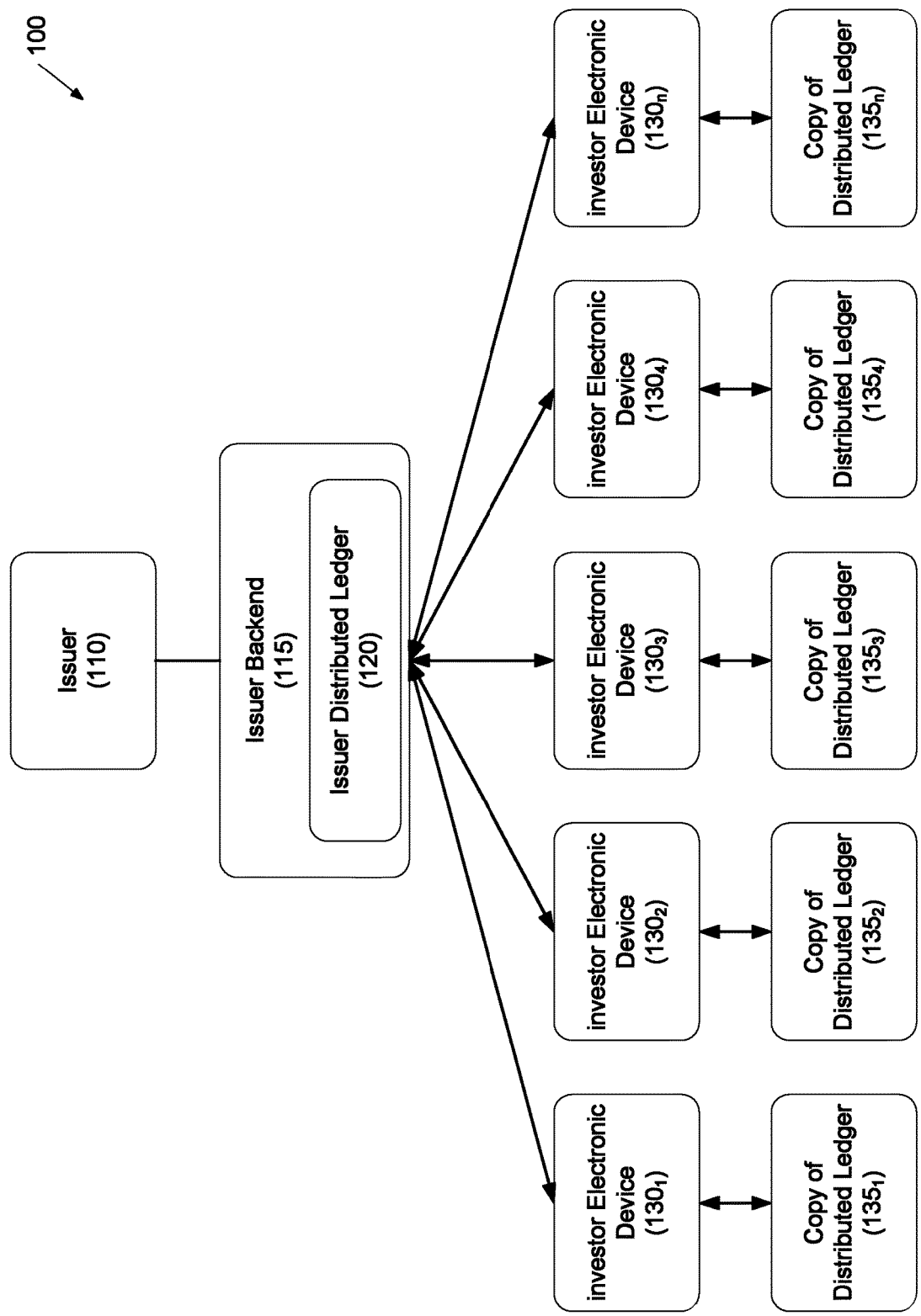
FIG. 1 depicts a system for tokenizing corporate actions according to one embodiment.

Embodiments disclosed herein relate to systems and methods for tokenizing corporate actions. In embodiments, distributed ledgers may be used in the on-line creation, processing, and settlement of corporate actions. Non limiting examples of corporate actions may include stock splits, dividends, mergers and acquisitions, rights issues, spin offs, etc.

In embodiments, distributed ledgers and/or smart contracts may facilitate an end-to-end review of corporate actions where no election is required from the client. In one embodiment, the use of distributed ledgers may streamline one or more of the following: the capture of event information; the reconciliation of holdings; and the settlement of entitlements. Reconciliation challenges may be alleviated by using multiple ledgers to avoid an overly-complex single ledger. Settlement of entitlements may be streamlined by the creation and/or use of digital event tokens representing investor entitlements to harmonize debit/credit process to investor wallets, facilitate the transfer of the entitlements to other parties, and to streamline the exercise of the corporate actions.

In embodiments, distributed ledgers and/or smart contracts may process inbound instructions from, for example, a client, and may output an instruction to, for example, a sub-custodian, or directly to the issuer or his issuing and paying agent, or registrar. For example, distributed ledgers may store inbound instruction(s) from a client to a custodian, as well as outbound instruction(s) to a sub-custodian, broker, issuer, agent, etc. Smart contracts may be used to create temporary event tokens to represent the different event options. For example, a token may be created for each event option in a quantity corresponding to the investor's entitlement. When the investor selects an option, the token representing that option is delivered into the issuer agent, and the other tokens may be removed from the wallet, expired, or otherwise invalidated. Alternatively, a token may be created for all event options in a quantity corresponding to the investor's entitlement. When the investor selects an option, the token is delivered to one of a plurality of a wallets of the issuer/agent that corresponds to the selected option into different wallets.

This may permit the holder of a token to deliver an instruction (i.e., a token) directly to the issuer or an agent of the client or the issuer. Benefits may include, for example, increased investor to issuer transparency, additional tradability potential, and speed to market.

In one embodiment, the holder of a token may instruct the issuer on behalf of the original investor, whereby the token represents the right to instruct on behalf of the investor. Thus, the holder of the token may maintain certain rights, while delegating other rights to another.

In embodiments, distributed ledgers and/or smart contracts may store, manage, and maintain client standing instructions including, for example, pre-advised client elections, actions, etc. For example, the distributed ledger may store inbound standing instructions, may centralize the storage of the standing instructions, may streamline the maintenance of existing standing instructions, may apply the detail of the standing instruction, and may increase transparency of data to improve client reporting.

In one embodiment, machine learning, deep learning, artificial intelligence, or any another form of advanced data analytics, etc. may be used to predict a client election in response to a voluntary action based on past elections or guide the client in his investment decision, based on trend analysis of his previous elections, or perform general analysis across clients.

In one embodiment, a client's portfolio and elections to voluntary events may be reviewed and evaluated. The client decision and the monetary impact (both positive and negative) may be reviewed to optimize the client's return based on historical events, market prices, embedded option value, etc. For example, if a client consistently elects to receive a cash dividend, but the stock is at a premium, the default standing action may be changed, or the client may be advised to select that option.

In one embodiment, a client's portfolio and elections may be reviewed and evaluated to assess whether the client has optimized the monetary value of the embedded entitlements (e.g., corporate actions, tax or other). In one embodiment, the client may be advised of any sub-optimization (e.g., a difference between potential value and actual value based on the client election). The client may be presented with options to transfer the entitlement (before exercise) to another party to optimize the value by transferring the tokens reflecting the entitlement. This may provide box management and value optimization benefits.

In one embodiment, a client and fund level look through of underlying assets may be used to monitor investment guideline adherence. This may include, for example, Environment and Social Governance (ESG) guidelines (regulatory and client, fund specific, etc.). This may provide enhanced box management and transparency benefits.

In embodiments, distributed ledgers and/or smart contracts may centrally store, manage, and maintain client data to support corporate actions where client-beneficial owner details may be required to accompany an election. For example, with tax optimization, embodiments may ensure that the client has all requisite withholding tax documentation in place, when required (e.g., if there is a requirement for a W-8 to be presented within 30 days, a check is triggered that this is in place and not due to expire in that time). Embodiments may provide benefits, such as ensuring that requisite data is in place, pre-population of data, and optimization of detail available.

In embodiments, distributed ledgers and/or smart contracts may reconcile client holding balances against sub-custodians or financial market infrastructures. They may reduce holding breaks and manual remediation, and may automate reporting and agreement of uninstructed balances.

Reconciliation challenges may be alleviated by the use of one or more distributed ledgers to avoid an overly-complex single layer. A flat ledger may be used for segregation of account management.

In embodiments, multiple interfaces may be used support multiple applications. Thus, data may be processed to a standard format as it is received. Client reference data may be stored at a plurality of locations, and may need to be fetched using smart contracts. Further, because multiple platforms (legacy and strategic) may be used, interfaces may be used to retrieve data and interact with those platforms.

In one embodiment, the distributed ledger may be used and expanded. For example, in addition to providing automated/rapid overviews of holdings to issuers, to provide regulatory reporting, attribute certain proceeds/benefits to holders (e.g., bonus loyalty shares), enhance and automate corporate action processing (e.g., notification, input, processing) based on end-user holdings, attribute administration rights to intermediaries (e.g., right to manage client holdings/instruct), perform automated eligibility checks (e.g., know your customer), shareholder threshold monitoring, distributed and process income (e.g., dividends, coupons, rights, etc.), process tax (at source), update balances/holdings based on settlement feeds, replace legacy processes (e.g., market specific registration forms), issue securities on chain, distribute prospectuses, etc.

In one embodiment, embodiments may normalize data as it is received for storage in the distributed ledger. It may also normalize different market practices. The distributed ledger may provide visibility to issuers and regulators, and may be leveraged as is necessary and/or desired.

The use of distributed ledgers may streamline the processes, reduce manual effort, centralize client reference data, reduce the number of technology dependencies, improve timeliness to avoid deadlines, reduce risk and the potential for errors, etc.

Referring to FIG. 1, a system for tokenizing corporate actions is disclosed according to one embodiment. System 100 may include issuer 110, which may be, for example, a corporation, a partnership, or any other suitable organization that may include a number of investors 110. Examples of investors include shareholders, members, partners, voting right holders, agents, other participants, etc.

Although embodiments may be described in the context of a corporate environment (e.g., corporation and investors), it should be recognized that the disclosed embodiments have broad applicability and are not so limited.

Issuer 110 may be associated with issuer backend 115, which may be a server, collection of servers, cloud processing, etc. Issuer backend 115 may generate tokens in response to issuer actions, such as corporate actions. In one embodiment, issuer backend 115 may include issuer distributed ledger 120, which may maintain issuer 110's copy of the distributed ledger.

In one embodiments, the tokens may be cryptographically secure tokens.

Issuer backend 115 may further include one or more wallet (not shown) that may receive tokens from investor electronic devices 130 in response to the investor exercising an option.

Each investor may be associated with a respective investor electronic device $130_1$, $130_2$, $130_3$, ... $130_n$. Investor electronic device 130 may be a smartphone, computer (e.g., desktop computer, laptop computer, notebook computer, tablet computer, etc.), Internet of Things (IoT) appliance, or any other suitable device.

Each investor electronic device 130 may maintain a copy of the distributed ledger $135_1$, $135_2$, $135_3$, ... $135_n$. Distributed ledgers 135 may be maintained on investor electronic devices 130, or may be maintained at a separate location, such as a separate electronic device (not shown), the cloud (not shown), etc.

In another embodiment, only one distributed ledger 135 may be maintained by issuer backend 115.

In one embodiment, investor electronic device 130 may execute a computer program (not shown) that may interface with issuer backend 115. Example computer programs include applications for the issuer, electronic wallets, investing applications, etc.

Distributed ledgers 120 and 135 may be any suitable ledger. In one embodiment, distributed ledgers 120 and 135 may be Blockchain-based ledgers, including Ethereum-based ledgers. Any other suitable type of distributed ledger may be used as is necessary and/or desired.

In one embodiment, distributed ledgers 120 and 135 may store and execute smart contracts.

Figure 2:
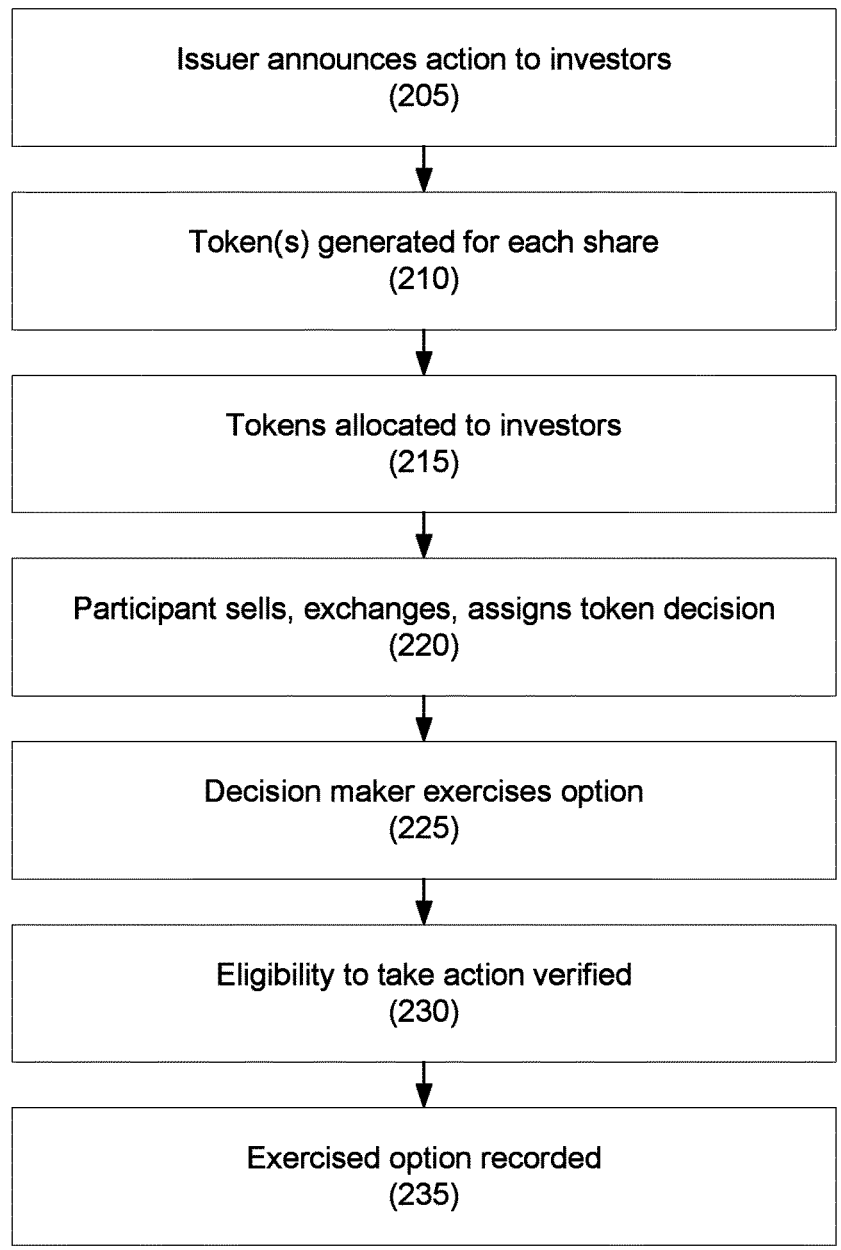
FIG. 2 depicts a method for tokenizing corporate actions according to one embodiment.

Referring to FIG. 2, a method for tokenizing corporate actions is disclosed according to one embodiment. In step 205, an issuer may announce an action to its investors. For example, an issuer may announce an action (e.g., an optional dividend) that may require a selection of an option by the issuer's investors (e.g., whether to take a cash dividend or additional shares). In one embodiment, the options may include a default option and an expiration for the option.

In addition, if there are multiple exclusive options in response to the action, then, the selection of one option will prevent the other option(s) from being selected. For example, if there are options to take a cash dividend or additional shares, the investor can select only one option. The selection or exercise of one option may automatically expire or invalidate the other option(s).

In step 210, the tokens may be generated for each share. For example, the issuer's backend may generate a token for each option per participating share, and the investor exercises the desired option by selecting the associated token. Thus, if there are two options (e.g., cash dividend or additional shares), two tokens will be generated for each participating share.

Alternatively, one token may be generated for each participating share, and the investor may exercise the desired option by providing the token to one of a plurality of issuer wallets.

In one embodiment, the tokens may be associated with a token allocation date that may vary based on event type. For example, for tenders/acquisitions, the allocation date may be the date that the event opens, whereas for subscription events, the allocation date may be the record, execution, or ex date.

In step 215, the token(s) may be allocated to the investors based on, for example, each investor's securities holdings. For example, one token may be provided for each ownership share (e.g., for an event level holding that may not require a decision). For event-level entitlements, more than one token may be provided for each share (e.g., if the terms are 5:1 client/asset). For an optional dividend, one token may be issued for each cash option (e.g., per entitled position), and one for stock (e.g., per entitled position), for a total of two tokens per entitled position. For an exchange offer with twelve options, one token may be issued per option (per entitled position), for a total of twelve tokens per entitled position.

In one embodiment, the token(s) may be delivered to an electronic wallet, software application, etc. executed by an electronic device associated with the investor.

In one embodiment, an anticipated option selection for the investor may be highlighted for the investor. For example, if the investor historically exercises a particular option (e.g., always takes a cash dividend), that option may be highlighted for the investor, may be set as the default option, etc. In another embodiment, the most favorable option for the investor may be highlighted for the investor.

In step 220, the investor may optionally sell, trade, or exchange ownership of the token(s) to a third party. In another embodiment, the investor may maintain ownership but may assign a decision maker (e.g., a proxy) for the decision. In one embodiment, the ownership or control of the token may be recorded in a database, the distributed ledger, or in a general ledger that maintains the access rights.

In step 225, the decision maker (e.g., the investor, owner of the action, proxy, etc.) may select an option. As discussed above, the decision maker may either select one of a plurality of tokens that represents the desired option and may provide that token to the issuer wallet, or the decision maker may deliver a token to one of a plurality of issuer wallets that represents the desired option.

In one embodiment, the electronic wallet may deliver the token to the issuer wallet.

In one embodiment, the selection of a token may invalidate or expire any other token(s). For example, the selection of a token associated with taking a cash dividend may automatically expire or invalidate the token associated with taking additional shares.

In one embodiment, the expiration may be performed by a smart contract.

In step 230, the issuer may verify the investor's eligibility to take the exercised option, and, in step 235, the exercised option will be executed. In one embodiment, the execution of the option may be written to a distributed ledger for the issuer, which may be copied all other distributed ledgers associated with the issuer.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other issuer; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for tokenizing corporate actions, comprising:
in an information processing apparatus for an issuer comprising at least one computer processor:
generating a plurality of cryptographically secure voting tokens for each participating share in an offering, each cryptographically secure voting token identifying an exclusive option for an investor to take in response to the offering and identifying an expiration for the exclusive option;
delivering the plurality of cryptographically secure voting tokens to an investor electronic wallet associated with each investor, wherein the investor electronic wallet is maintained on a distributed ledger and wherein the investor selects one of the plurality of cryptographically secure voting tokens from the investor electronic wallet and the selection of the one of the plurality of cryptographically secure voting tokens expires cryptographically secure voting tokens that were not selected;
receiving, at a single issuer electronic wallet for the issuer that is maintained on the distributed ledger, the selected cryptographically secure voting token from the investor electronic wallet, the single issuer electronic wallet is provided to receive the cryptographically secure voting tokens; and
executing the exclusive option identified by the received cryptographically secure voting token;
wherein the investor electronic wallet is configured to predict the cryptographically secure voting token that the investor will select based on at least one prior selection by the investor, and the investor electronic wallet is configured to highlight the predicted cryptographically secure voting token in a display.

2. The method of claim 1, further comprising:
committing the exclusive option identified by the received cryptographically secure voting token to the distributed ledger.

3. The method of claim 1, wherein the offering has a default exclusive option.

4. The method of claim 1, wherein the cryptographically secure voting tokens are provided to a third party by an investor, and further comprising committing an updated ownership to the distributed ledger.

5. The method of claim 1, wherein the cryptographically secure votingtoken is received from a third party.

6. A system for tokenizi ng corporate actions, comprising:
a plurality of investorelectronicdevices, each investor-electronicdevice associated with an investor; and
an issuer backend for an issuer of a financial instrument, the issuer backend maintaining a single issuer wallet that is configured to receive cryptographically secure voting tokens from the plurality of investor electronic devices;
wherein:
the issuer backend generates a pluralityof cryptographically secure voting tokens for each participating share in an offering, each cryptographically secure voting token identifying an exclusive option forthe investors to take in response to the offering and an expiration for the exclusive option;
the issuer backend deliversthe plurality of cryptographically secure voting tokens to an electronic wallet associated with each of the plurality of investor electronic devices, wherein the investor selects one of the plurality of cryptographically secure voting tokens from the investor electronic wallet and the selection of the one of the plurality of cryptographically secure voting tokens expires cryptographically secure voting tokens that were not selected;
the issuer backend receives the selected cryptographically secure voting token from one of the investor electronic devices at the issuer wallet;
the issuer backend expires the plurality of cryptographically secure voting tokens that were not received from the investorelectronicdevices; and
the issuer backend executesthe exclusive option identified bythe received cryptographically secure voting token;
wherein each investor electronic wallet is configured to predict the cryptographically secure voting token that the investor will select based on at least one prior selection by the investor, and to highlight the predicted cryptographically secure voting token in a display on the investor electronic devices.

7. The system of claim 6, wherein the issuer backend commits the exclusive option identified bythe received cryptographically secure voting token to a distributed ledger.

8. The system of claim 6, wherein the offering has a default exclusive option.

9. The system of claim 6, wherein the cryptographically secure voting tokens are provided to a third party by an investor, further comprising committing an updated ownership to a distributed ledger.

10. The system of claim 6, wherein the cryptographically secure voting token is received from a third party.

* * * * *